(No Model.)
J. A. SEAMAN.
TOOLS FOR WORKING OFF KEGS AND BARRELS.
No. 271,660. Patented Feb. 6, 1883.
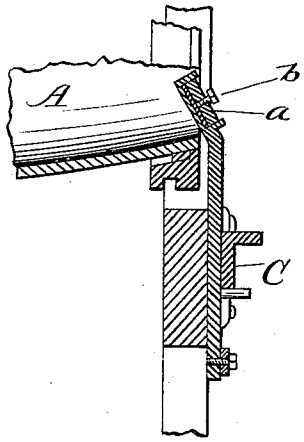
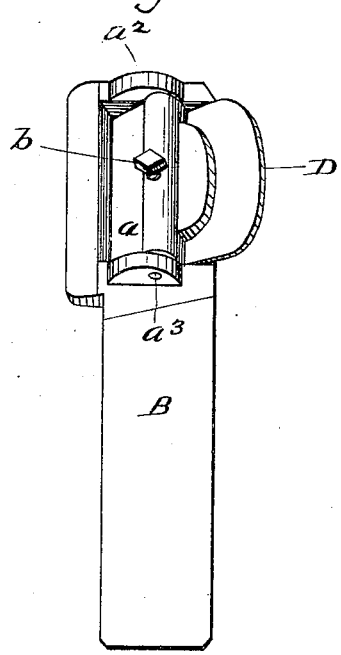
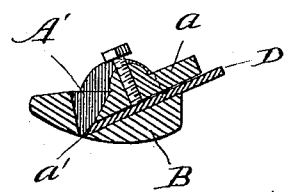
Witnesses —
F. B. Townsend
Chas. E. Gaylord.
Inventor —
John A. Seaman
By J. B. Coupland & Co
Attys

United States Patent Office.

JOHN A. SEAMAN, OF CHICAGO, ILLINOIS.

TOOL FOR WORKING OFF KEGS AND BARRELS.

SPECIFICATION forming part of Letters Patent No. 271,660, dated February 6, 1883.

Application filed March 30, 1882. (No model.)

*To all whom it may concern:*

Be it known that I, JOHN A. SEAMAN, of Chicago, county of Cook, and State of Illinois, have invented a certain new and useful Improvement in Machines for Working Off Kegs and Barrels, of which the following description will enable others to make and use the same, reference being had to the accompanying drawings, and to the letters of reference marked thereon, forming a part of this specification.

This invention relates to an improvement in Letters Patent No. 189,878; and it consists in providing a stock or tool-holder adapted to firmly hold an adjustable knife or cutter for trimming off the chine of the barrels, the cutting-edge being made to project beyond the convex surface of the upper inwardly-inclined end of the stock presented to the end of the barrels, as will be hereinafter more fully set forth.

The cutter $h$ in the patent referred to above is not adjustable as to the depth of the cut, and was made in one solid piece, presenting a flat surface to the end of the barrel, which form of cutter cannot be properly gaged, and in practice has the very objectionable feature of running in too deep and gouging out the work, so as to leave an uneven surface. These objections I have overcome in the present device, which forms the subject-matter of this application.

Figure 1 is a vertical section of the device embodying my improvement; Fig. 2, a transverse section; Fig. 3, a front elevation or face view.

Referring to the drawings, A represents a part of a barrel or keg, showing the relative position of the same with the cutter.

B is the stock or cutter-holder, attached to the slide C, which has a vertical adjustment. The head or upper end of the stock B is bent inward, as shown in Fig. 1 of the drawings, for the purpose of bringing it into position for trimming off the ends of the packages. The inner or bearing surface of the head, being rounded, conforms to the circle of the package being worked off, and prevents the knife or cutter from going beyond the required depth. The head of the stock is provided with the recess A' for the reception of the adjustable knife or cutter D and the clamping-plate $a$, provided with the set-screw $b$. The cutting-edge of the knife D projects through the slot $a'$ in the upper end of the stock B, and may be set to make a light or heavy cut, as may be required, the arrangement being similar to the ordinary smoothing plane. The clamping-plate $a$ is retained in place by being pivoted to the projecting ears $a^2$ $a^3$ and the set-screw $b$, which passes down through the same and serves to secure the cutter at any point to which it may be adjusted.

One of the essential features of this improvement is the rounded bearing in front of the cutting-edge, forming a guide or gage for the same.

The cutter may be secured to the stock by means of a wedge corresponding to the shape of the knife, instead of the set-screw shown, or in any other way that will answer the purpose.

Having thus described my invention, what I claim as new, and desire to secure by Letters Patent, is—

The stock or tool-holder A, carrying in one end thereof an adjustable knife, said end being bent over at an oblique angle relative to the line of its axis for the purpose of giving to the end of the barrel the required bevel, and also adapted to present a convex bearing-surface to the line of the work, whereby the knife or cutter is gaged to cut to a uniform depth, substantially as described.

JOHN A. SEAMAN.

Witnesses:
D. P. JONES,
S. A. GOULD.